United States Patent
Berger et al.

(10) Patent No.: US 10,031,810 B2
(45) Date of Patent: *Jul. 24, 2018

(54) GENERATING A CHAIN OF A PLURALITY OF WRITE REQUESTS

(71) Applicant: INTERNATIONAL BUSINESS MACHINES CORPORATION, Armonk, NY (US)

(72) Inventors: Jeffrey A. Berger, San Jose, CA (US); Susan K. Candelaria, Tucson, AZ (US); Matthew J. Kalos, Tucson, AZ (US); Beth A. Peterson, Tucson, AZ (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/151,128

(22) Filed: May 10, 2016

(65) Prior Publication Data

US 2017/0329675 A1 Nov. 16, 2017

(51) Int. Cl.
*G06F 11/14* (2006.01)
*G06F 11/20* (2006.01)

(52) U.S. Cl.
CPC ...... *G06F 11/1435* (2013.01); *G06F 11/1464* (2013.01); *G06F 11/2069* (2013.01)

(58) Field of Classification Search
CPC ............................ G06F 11/14; G06F 11/1465
USPC ................................ 714/6.3; 710/5, 20, 24
See application file for complete search history.

(56) References Cited

U.S. PATENT DOCUMENTS

| | | | | |
|---|---|---|---|---|
| 7,818,472 B2* | 10/2010 | Kalos | ............ | G06F 13/124 370/393 |
| 7,818,473 B2 | 10/2010 | Candelaria et al. | | |
| 8,127,047 B2* | 2/2012 | Ogata | ............ | G06F 3/061 710/20 |
| 8,185,701 B2* | 5/2012 | Berger | ............ | G06F 17/30442 707/705 |

(Continued)

OTHER PUBLICATIONS

"IBM DFSMSdfp Advianced Services", IBM Corporation, Document SC23-6861-01, 1979, pp. 534.

(Continued)

*Primary Examiner* — Kamini B Patel
(74) *Attorney, Agent, or Firm* — David W. Victor; Konrad Raynes Davda & Victor LLP

(57) ABSTRACT

Provided are a computer program product, system, and method for generating a chain of a plurality of write requests including a commit wait flag and plurality of write requests. The commit wait flag is set to one of an indicated first value or a second value. The commit wait flag is set to the first value to cause a storage server to process the write requests by requiring a current write request being processed to complete before transferring data for a next write request following the current write request. The commit wait flag is set to the second value to cause the storage server to process the write requests by transferring data for the next write request before completing the current write request preceding the next write request. The write request chain is sent to the storage server to apply the write requests to the storage.

20 Claims, 5 Drawing Sheets

(56) References Cited

U.S. PATENT DOCUMENTS

| | | | | |
|---|---|---|---|---|
| 8,990,439 B2* | 3/2015 | Carlson | ............... | G06F 3/002 710/5 |
| 2009/0010439 A1* | 1/2009 | Okamoto | ............... | G06F 21/10 380/280 |
| 2010/0036978 A1* | 2/2010 | Candelaria | ............ | G06F 13/126 710/24 |
| 2013/0080828 A1* | 3/2013 | Sheffield | ............ | G06F 11/1662 714/6.22 |
| 2014/0089599 A1* | 3/2014 | Okawara | ............... | G06F 9/3017 711/140 |

OTHER PUBLICATIONS

"IBM System z—Hardware Workshop", IBM Corporation, Sep. 7, 2009, pp. 48.

L. Ricci, "High Performance Ficon Demystified", 2011, pp. 52.

U.S. Appl. No. 15/151,121, filed May 10, 2016.

List of IBM Patents or Patent Applications Treated as Related dated May 10, 2016, pp. 2.

Response dated Jan. 29, 2018, pp. 14, to Office Action dated Oct. 27, 2017, pp. 19, for U.S. Appl. No. 15/151,121, filed May 10, 2016.

Notice of Allowance dated Apr. 27, 2018, pp. 16, for U.S. Appl. No. 15/151,121, filed May 10, 2016.

U.S. Appl. No. 16/005,591, filed Jun. 11, 2018.

Preliminary Amend dated Jun. 11, 2018, pp., for U.S. Appl. No. 16/005,591, filed Jun. 11, 2018.

U.S. Appl. No. 15/974,619, filed May 8, 2018.

List of IBM Patents or Patent Applications Treated as Related, dated Jun. 12, 2018, pp. 2.

Preliminary Amend dated May 8, 2018, pp., for U.S. Appl. No. 15/974,619, pp. 10.

* cited by examiner

GENERATING A CHAIN OF A PLURALITY OF WRITE REQUESTS

BACKGROUND OF THE INVENTION

1. Field of the Invention

The present invention relates to a computer program product, system, and method for generating a chain of a plurality of write requests.

2. Description of the Related Art

Write operations may be grouped in a chain of write requests, such as the case with a zHPF Channel Program. The zHPF Channel Program will include a Transport Control Area (TCA) containing the commands and control parameters. Each command is represented by a Device Command Word (DCW) that consists of a command code, flags to indicate chaining and other options, a control data count, and a data byte count, if the command is used to transfer data. If the command transfers control data (command parameters) to the device, the control data follows the DCW in the TCA. The command code used is the same as those used in a Channel Command Word (CCW).

The CCW is the original I/O operation used for communications with the channel subsystem between a host server, e.g., mainframe, and a channel attached storage system (channel attached device). The CCW contains a channel command, such as read, write, or control, along with the data address of the data area involved. The data is passed to the channel subsystem. The channel subsystem communicates status of the I/O back to the issuing application.

Unlike CCWs, DCWs do not point to their corresponding I/O buffers. The I/O buffers for all DCWs are pointed to by the TCW, and the I/O buffers associated with a particular DCW are based on the amount of data transferred by the previous DCWs.

A Fibre Connection ("FICON") (Command Mode) write chain would consist of a number of CCWs which would allow the host server to transfer data to the attached storage system. Each CCW contains a command to be executed and either points to control parameters, or points to storage areas containing the data to be read or written. A CCW may point directly to the storage areas or may use some format of indirect addressing (Indirect Address List (IDAL) or a Modified Indirect Address List (MIDAL)) to point to the storage areas. A standard FICON write chain may consist of a Define Extent, Locate Record (Extended), and Write Commands. The Define Extent and Locate Record (Extended) may be collapsed into the Prefix Command. The Locate Record parameters describe a domain of operations that will immediately follow in the chain. These parameters define the read or write domain type, the starting address for the data transfer, as well as the expected number of data transfer commands in the chain. The chain may also include additional Locate Record (Extended) commands after the initial domain of write commands have been completed. These additional Locate Record (Extended) commands are called Imbedded Locate Record commands and allow for additional domains to be defined in the chain. These domains may be contiguous or discontiguous.

A System Z High Performance FICON ("zHPF") (Transport Mode) write chain is a further step in the compression of the control data used to describe the transfer operations performed by the chain. A write DCW will specify a PFX command with an Imbedded CCW opcode and Intent Count. The Imbedded CCW opcode would be equivalent to the Write Command Codes that are used for the Write CCWs that follow the DX/LR or PFX in a FICON write chain. In addition, the Prefix may also have an Imbedded Locate Record count and an Imbedded Locate Record List. These Imbedded Locate Records entries allow for additional domains to be specified in a single DCW. In addition, there may be additional Locate Record Extended DCWs in the Transport Mode chain which may also have Imbedded Locate Record entries.

There is a need in the art for improved techniques for processing a write chain of write requests, such as a write chain of many locate record commands.

SUMMARY

Provided are a computer program product, system, and method for generating a chain of a plurality of write requests including a commit wait flag and plurality of write requests directed to storage locations in the storage. The commit wait flag is set to one of an indicated first value or a second value. Setting the commit wait flag to the first value causes the storage server to process the write requests by requiring a current write request comprising one of the write requests being processed to complete writing data to a storage location in the storage before transferring data for a next write request following the current write request. Setting the commit wait flag to the second value causes the storage server to process the write requests by transferring data for the next write request before completing transfer of the data for the current write request preceding the next write request. The write request chain is sent to the storage server to apply the write requests to the storage.

DETAILED DESCRIPTION

In certain implementations, processing a write request chain of multiple groups of write requests, such as a channel command having multiple locate record (LR) domains requires that all the write requests in each group to complete before processing a next group of write requests. The storage system must stop processing and wait for the data to be committed before continuing execution in the subsequent group of writes, locate record (LR) write domain. In this way, if an I/O error occurs, which would cause the channel command to terminate, the software could select to only retry the write requests from the beginning of the write request group or LR domain that failed and not the entire chain of requests. This waiting required for all write requests to complete lowered the elapsed time of the I/O recovery after the error.

Described embodiments provide techniques to accelerate write request execution and improve I/O service times by providing a commit wait flag in the write chain allowing indication of whether a previous group of write requests, such a previous LR domain, needs to complete or commit before a next group of write requests, next LR domain, in the chain can be processed. By indicating that commit is not required, a next group of write requests in the write chain can be processed before the write data for the previous group of write requests is transferred for processing. Further, write processing will complete faster with less impact on customer performance by allowing a next group of write requests in the chain to proceed without the previous request completing. With the commit wait flag set to indicate commit is not required, the data for a next write command may be accessed and transferred before the data for the previous write command is transferred or committed.

Figure 1:
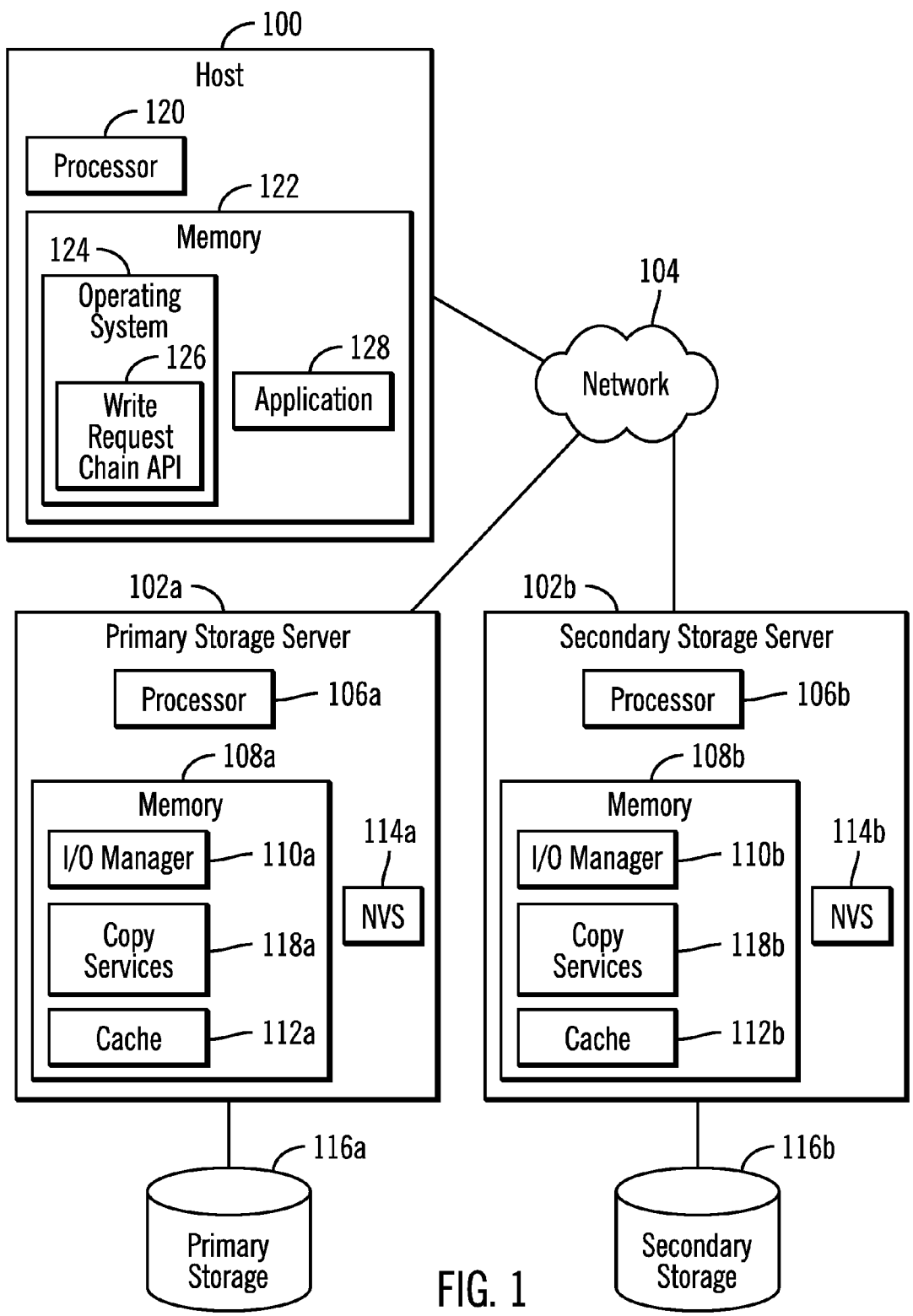
FIG. 1 illustrates an embodiment of a storage environment.

FIG. 1 illustrates an embodiment of a mirror or single copy storage environment having a host 100, primary storage server 102a, and secondary storage server 102b that communicate over a network 104. The storage servers 102a, 102b each include a processor 106a, 106b, system memory 108a, 108b, having Input/Output (I/O) managers 110a, 110b that manage write requests from the host 100, and cache 112a, 112b, as well as a non-volatile storage device (NVS) 114a, 114b. Write data in the caches 112a, 112b may be backed-up in the NVS 114a, 114b in the same server 102a, 102b, respectively. Alternatively, a cache 112a, 112b in one storage server 102a, 102b may backup writes in the NVS 114b, 114a of the other storage server 102b, 102a, respectively. A primary storage 116a is coupled to the primary storage server 102a and a secondary storage 116b is coupled to the secondary storage server 102b. The I/O managers 110a, 110ab manage I/O requests from the host 100 directed to data in the attached storages 116a, 116b.

The host 100 includes a processor 120, a system memory 122, and an operating system 124 including includes a write request chain Application Programming Interface (API) 126 to generate write request chains of ordered write requests to process writes from applications 128 executing in the host 100 or other systems in the network 104 submitting I/O requests to the host 100.

In one embodiment, the storage servers 102a, 102b include copy services 118a, 118b to mirror/synchronize host 100 writes to the secondary storage sever 102b to write to the secondary storage 116b. In such embodiments, a host write operation does not complete and is not committed until data is confirmed to have been written to the primary 116a and secondary 116b storages. The I/O manager 110a may not confirm complete to the host 100 until completing writing the data to the primary 116a and secondary storages 116b. Alternatively, the I/O manager 110a may confirm complete upon storing the write data in the cache 112a, 112b and/or NVS 114a, 114b in the storage servers 102a, 102b before the data is written to the storage 116a, 116b.

In another embodiment, the server 102a may not synchronize writes to the secondary storage server 102b and operate as in an environment without the secondary storage server 102b. In such case, write complete or commit indicates the write data is committed in the storage 116a or cache 112a and/or /NVS 114a or 14b.

The storage servers 102a and 102b may be comprised of an enterprise storage server suitable for managing access to attached storage devices, such as the International Business Machine Corporation's ("IBM") DS8000® storage system. (DS8000 is a registered trademark of IBM in countries throughout the world). The host 100 operating system 124 may comprise an operating system such as Z Systems Operating System (Z/OS®) from International Business Machines Corporation ("IBM") or other operating systems known in the art. (Z/OS is a registered trademark of IBM throughout the world).

The network 104 may comprise a Storage Area Network (SAN), Local Area Network (LAN), Intranet, the Internet, Wide Area Network (WAN), peer-to-peer network, wireless network, arbitrated loop network, etc.

The storages 116a, 116b may each comprise one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices comprising the storages 116a, 116b may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, such as servers, storages, active and inactive copy relationships, etc., are shown, there may be any number of these components.

In one embodiment, the host 100 operating system 124 may include a channel subsystem, which has sub-channels that provide the information needed to access the server 102a and underlying storage 116a in which volumes are configured. The storage server 102a, 102b I/O managers 110a, 110b may include Unit Control Blocks (UCBs) that provide a software representation of the underlying volumes, and point to the sub-channel that has the information on how to access the device including the volume addressed by the UCB.

Figure 2:
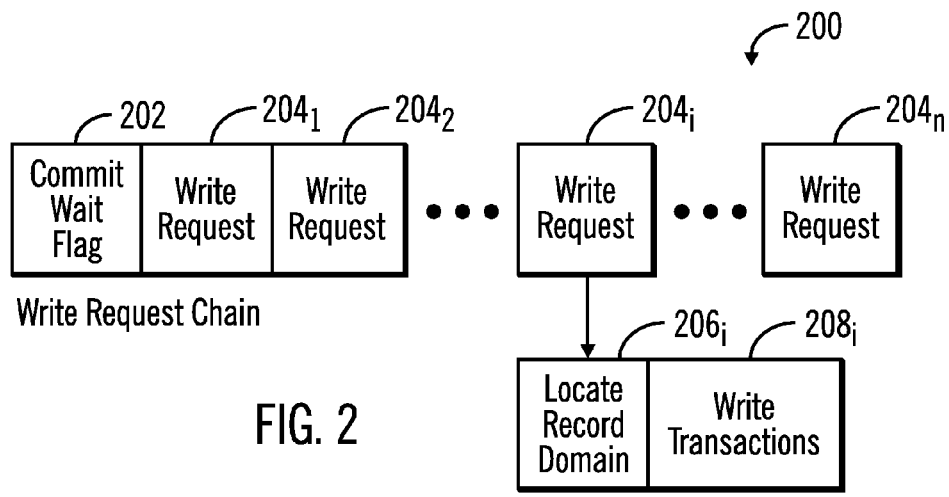
FIG. 2 illustrates an embodiment of a write chain of write requests.

FIG. 2 illustrates an embodiment of a write request chain 200 produced by the write request chain API 126 executing in the operating system 124, or another connected host system that includes a series of write requests $204_1$, $204_2 \ldots 204_n$ that may specify to write data to discontiguous locations in the storage 116a, 116b. The write request chain 200 includes a commit wait flag 202 indicating a commit "wait" mode where the processing of a subsequent write request $204_{i+1}$ must wait for completion/committing of a previous write request $204_i$ or a commit "no wait" mode where the processing of a subsequent write request $204_{i+1}$ may proceed without having to wait for the previous write request $204_i$ to complete, i.e., is committed. For the commit "no wait" mode, processing of a subsequent write request $204_{i+1}$ may be initiated after initiating and beginning the transfer of data for the previous write request previous write request $204_i$, without having to wait before the transfer of the write data completes. The terms "commit" and "complete" as used herein refer to a transfer of data to the storage 116a, 116b or another suitable storage, such as cache 112a, 112b and/or NVS 114a, 114b, such that acknowledgment can be returned that the write completed. In mirror copy environments where the data is mirrored between the primary storage server 102a and secondary storage server 102b, commit or complete is not confirmed until the write data is confirmed/complete at both the primary 102a and secondary 102b storage servers.

Each write request $204_1, 204_2 \ldots 204_n$ may indicates a location in the storage 116a, 116b and an operation type. In one embodiment, the each write request $204_1, 204_2 \ldots 204n$ may comprise a write request group identifying a range of storage locations, or tracks, and a series of write transactions to the identified range. In one implementation, each write request $204_i$ may include a locate record (LR) domain $206_i$ specifying a range or group of tracks and a plurality of write transactions $208_i$ directed to the tracks identified in the LR domain $206_i$, where the write transactions $208_i$ are ordered according to a predetermined order of the tracks to which they write, i.e., ascending order. Sequential write requests $204_1, 204_2 \ldots 204_n$ in the write request chain 200 may have write transactions to non-contiguous ranges or sections of tracks. Each locate record domain $206_i$ may specify a location, search argument comprising a track and record within the track, length of data to transfer, and operation types. In further embodiments, some or all of the write requests $204_1, 204_2 \ldots 204n$ may comprise a single write transaction.

In one embodiment, the write chain API 126 may generate write requests $204_1, 204_2 \ldots 204_n$ in a device command word (DCW), where the commit wait flag 202 is located within a prefix parameter of the DCW command word. The locate record domains $206_i$ and write transactions $208_i$ for each write request group may be packaged in the prefix parameter or in parameters following the prefix parameters of the command word. In certain embodiments, the DCW chain may have a first locate record followed by embedded truncated locate records for operations to different locations.

In locate record embodiments, the host operating system 124 transfers the write requests $204_1, 204_2 \ldots 204_n$, or locate records to a channel subsystem in the host 100 to manage the transfer of the write requests to the storage server 102a. The channel subsystem directs the flow of read and write operations between the host 100 and storage server 102a to relieve the host operating system 124 of the task of communicating with the storage server 102a to allow the host operating system 124 to perform data processing and proceed concurrently with the Input/Output (I/O) processing being handled by the channel subsystem. The channel subsystem uses and manages channel paths as communication links from the host 100 to the storage server 102a.

In one embodiment, the write request chain 200 may be used with a FICON (command mode) write chain to allow the host server to transfer data to the attached storage system. In another embodiment, the write request chain 200 may be used with a zHPF (Transport Mode) write chain. In further embodiments, the write request chain may be used with different transport and command protocols.

In FICON implementations, the write requests $204_1, 204_2 \ldots 204n$ or locate record domains 206i may be collapsed into a Prefix Command, and the locate record 206i parameters describe a domain of operations that will immediately follow in the chain. In zHPF implementations, a Prefix may have an imbedded locate record list, such that the imbedded locate records 206i allow for additional domains to be specified in a single DCW. In FICON and zHPF implementations, each write request $204_1, 204_2 \ldots 204n$ including locate records domains 206i specifies one or more write operations to perform at the storage locations, where the locate records may specify write operations for many discontiguous locations. Each locate record 206i command specifies a location, search argument comprising a track and record within the track, length of data to transfer, and operation types. The locate records and the associated writes in the chain may be processed sequentially and all the write operations for one locate record domain must complete or be committed before the next locate record domain is processed.

Figure 3:
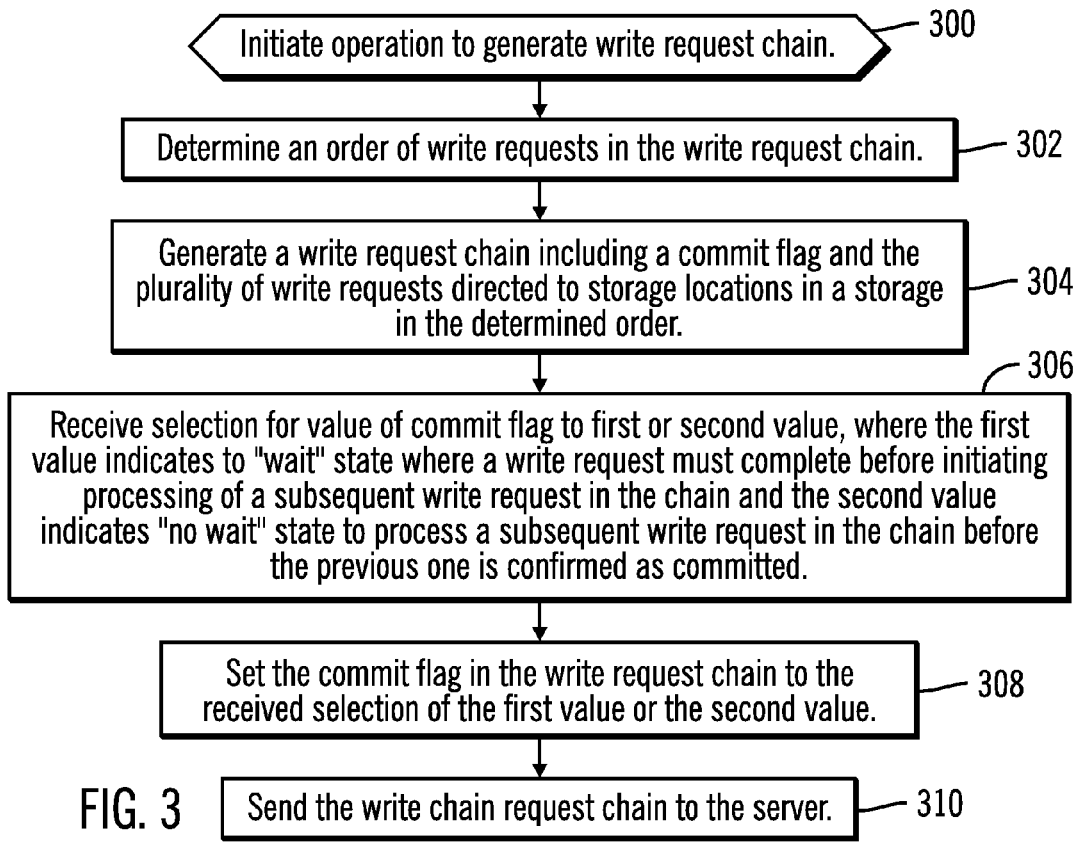
FIG. 3 illustrates an embodiment of operations to generate a write request chain.

FIG. 3 illustrates an embodiment of operations performed by the write request chain API 126 to generate a write request chain 200. Upon initiating (at block 300) an operation to generate a write request chain 200, the write request chain API 126 determines (at block 302) an order of write requests $204_1, 204_2 \ldots 204n$ or locate records to include in the write request chain 200. The write request chain 200 is generated (at block 304) including a commit wait flag 202 and the plurality of write requests $204_1, 204_2 \ldots 204n$ directed to storage locations in a storage in the determined order. The write requests may comprise write request groups, each having multiple write transactions 208i to a specified range of tracks or locate record domain 206i. The write request chain API 126 may receive (at block 306) selection of a value for the commit wait flag 202, such as a first or second value, where the first value indicates a "wait" state to commit a write request $204_i$ before initiating processing of a next write request $204_{i+1}$ and the second value indicates "no wait", so that a subsequent write request $204_{i+1}$ can be processed before the previous write request $204_i$ is confirmed as completed. The selection may be made by user selection through a user interface or by a program/application initiating the write. The commit wait flag 202 is set (at block 308) to the received selection of the first value ("wait") or the second value ("no wait"). The write request chain 200 is then sent (at block 310) to the storage server 102a to process as a standalone server or in a mirror/synchronization environment.

Figure 4:
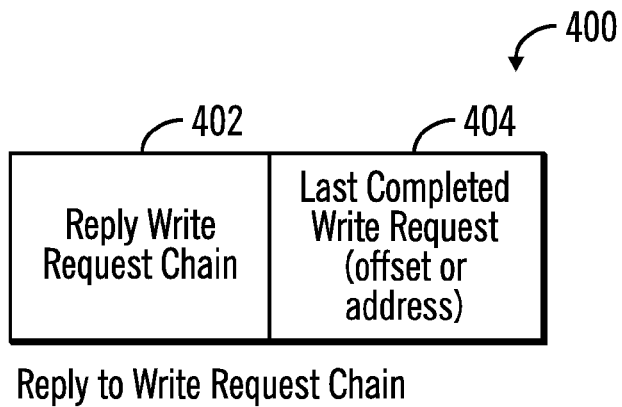
FIG. 4 illustrates an embodiment of a reply to a write request chain.

FIG. 4 illustrates an embodiment of a reply to a write request chain 400 from the sever 102a I/O manager 110a, including: a reply code 402 indicating fail or success and a last completed write request 404, which may comprise an offset into the write request chain 200 of the last completed write request $204_1, 204_2 \ldots 204_n$ or an address to which the last completed write request $204_1, 204_2 \ldots 204_n$, was directed. Alternatively, the last completed write request 404 may not be indicated and such information may be determined or transmitted separately.

Figure 5:
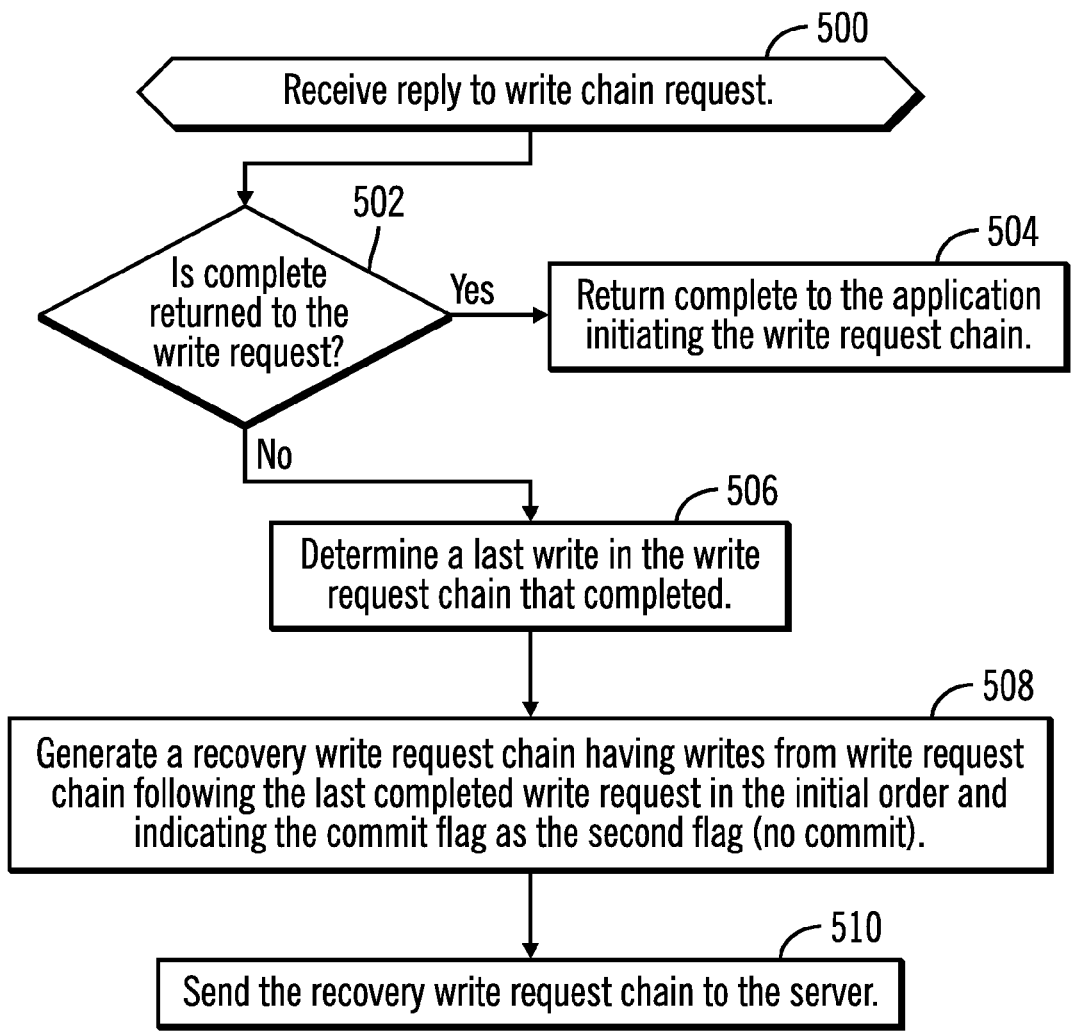
FIG. 5 illustrates an embodiment of operations to process a received reply to a write request chain.

FIG. 5 illustrates an embodiment of operations performed by the host operating system 124 to process a reply from the to an initial write request chain $200_I$. Upon receiving a reply from the control unit I/O manager $104a_1 \ldots 104a_m$ to the initial write request chain $200_I$, if (at block 502) complete is returned, indicating that all write requests $204_1, 204_2 \ldots 204_n$ were successfully committed, then the host operating system 124 may return (at block 504) complete to the application 128 initiating the write request chain 200I associated with the reply 400. If (at block 502) a failure was returned in the reply 400, then the host operating system 124 determines (at block 506) the last completed write request 404, which may comprise an offset into the chain or the address of the write request that last completed. The host operating system 124 generates (at block 508) a recovery write request chain $200_R$ for which the reply 400 was returned having writes $204_i, 204_2 \ldots 204_n$ from the write request chain following the last completed write request $204_{i-1}$ in the same order in which they were included in the initial write request chain $200_I$, and indicating the commit wait flag 202 as the second flag (no commit). The recovery write request chain $200_R$ is then sent (at block 510) to the storage server 102a to continue the write chain from where the write request was interrupted.

When a reply 400 is sent to the recovery write request chain $200_R$, than the operations of FIG. 5 may be performed again with the recovery write request chain $200_R$ comprising the write request chain being processed to generate a further recovery write request chain $200_{R+1}$.

For embodiments where the write request chain 200 is mirrored to a secondary storage server 102b, then the host operating system 124 during a recovery operation may determine the last write that was committed at the secondary storage server 102b, and generate the recovery write request chain $200_R$ to have the write request following the last completed write request at the secondary storage server 102b if that is different from the last completed write request at the primary storage server 102a. This difference may be determined based on a predetermined fixed difference, such that the secondary storage server 102b is a fixed number of write requests being committed behind that of the primary storage server 102a, or by querying the secondary storage server 102b to determine the last committed write request for the write request chain 200.

Figure 6:
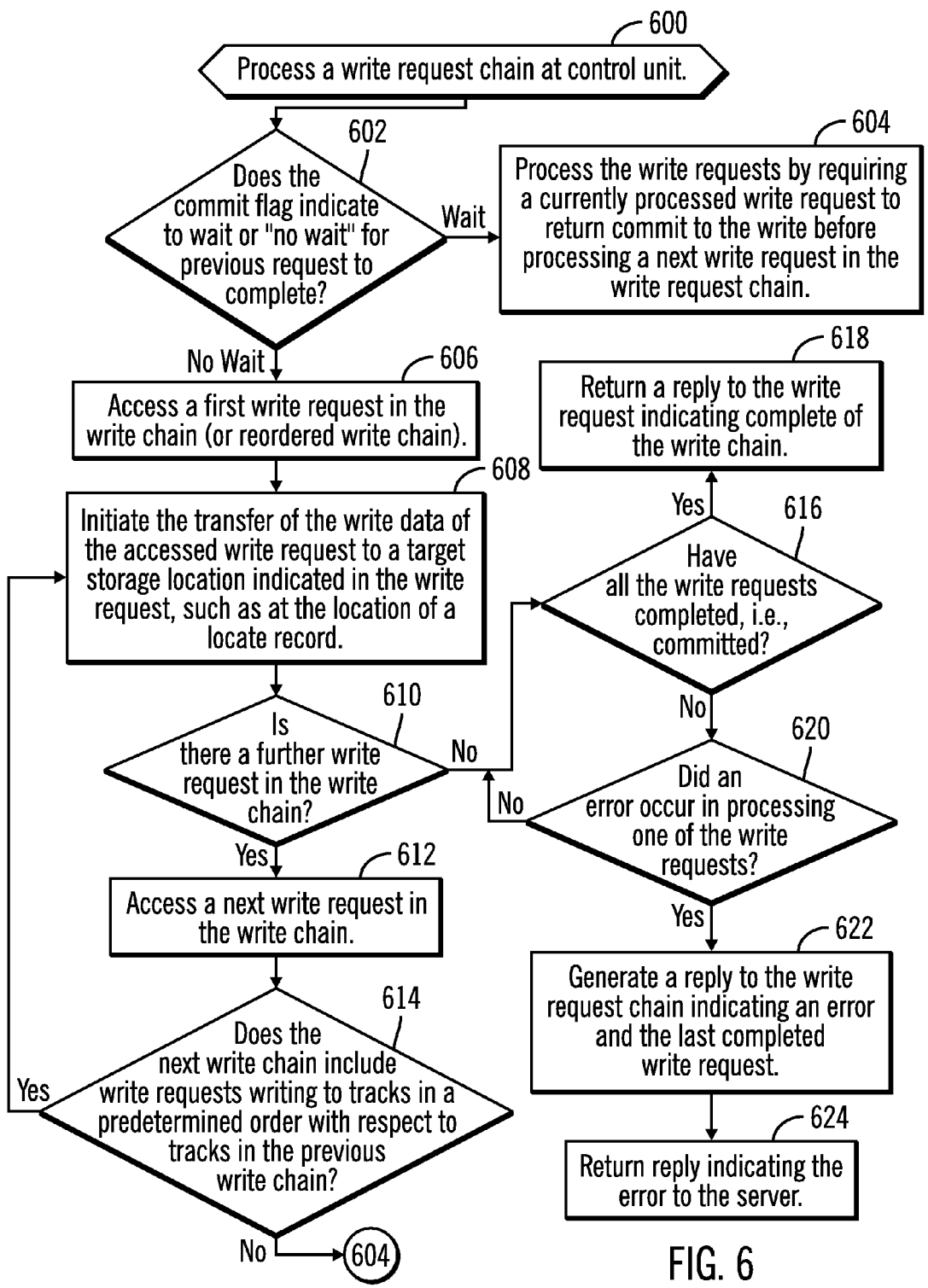
FIG. 6 illustrates an embodiment of operations to process a chain of write requests.

FIG. 6 illustrates an embodiment of operations performed by the I/O manager 110a at the primary storage server 102a to process a write request chain 200 received from the write request chain API 126 and host 100. Upon processing (at block 600) a write request chain 200, the I/O manager 110a determines (at block 602) whether the commit wait flag 202 indicates commit "wait" or "no wait". If the commit wait flag 202 indicates to wait, then the I/O manager 110a processes (at block 604) the write requests by requiring a currently processed write request $204_1$, $204_2$ . . . $204_{n-1}$ to return complete or commit before processing a next write request $204_2$, $204_2$ . . . $204n$ in the write request chain 200. In mirror copy environments, the copy services 118a may further wait for one write request $204_1$, $204_2$ . . . $204_{n-1}$ to complete at both the primary 102a and secondary 102b storage servers before processing the next write request in the chain 200. The copy services 118a would transfer a write request $204_1$, $204_2$ . . . $204_{n-1}$ being processed at the primary storage server 102a to the secondary storage server 102b to mirror.

If (at block 602) the commit wait flag indicates "no wait", that commit or complete does not need to occur for each write request before a next write is performed, then the then the I/O manager 110a accesses (at block 604) a first write request $204_1$ in the write chain 200 and initiates (at block 614) the transfer of the write data for the accessed write request $204_i$ to a target storage location at the storage 116a, 116b indicated in the write request $200_i$, such as at the location of a locate record. If the accessed write request $204_i$ comprises a write request group, then the I/O manager 110a would process each of the write transactions $208i$ for the locate record domain $206_i$ of the group. In mirror/synchronization environments, upon initiating (at block 608) the processing of a write request $204_i$, the copy services 118a would transfer the write request $204_i$ to the secondary storage server 102b to process, which may be processing concurrently with previously write requests being processed at the secondary storage sever 102b.

After initiating the write transfer, if (at block 610) there are further write requests $204_2$ . . . $204_n$ in the write chain 200, then the next write request $204_{i+1}$ in the write chain 200 is accessed (at block 612). The I/O manager 110a determines (at block 614) whether the next write request $204_{i+1}$ is directed to one or more write requests writing to tracks in a predetermined order, such as an ascending order, with respect to the tracks written in the previous write request $204_i$, previously initiated. If the tracks are not in the predetermined order, such as in a descending order, then control proceeds to block 604 where the I/O manager 110a processes the write requests in a "wait" commit mode by requiring that the write request $204_{i+1}$ and any subsequent write requests complete processing before the next write request is processed. In an alternative embodiment, if the order is not ascending, then just the next write request $204_{i+1}$ is processed in the "wait" commit mode where it must complete before a further next write request $204_{i+2}$ is processed. However, if the further next write request $204_{i+2}$ is in the predetermined order with the respect to the previous write request $204_{i+1}$, then processing may return to "no wait" commit mode.

If (at block 614) the next write request $204_{i+1}$ writes to tracks in the predetermined order with respect to tracks written by the previous write request $204_i$, then control proceeds back to block 608 to process that next write request $204_{i+1}$. This next write request may be processed and initiated before the previous write request completes.

If (at block 610) there are no further write requests to process, then if (at block 616) complete has returned for all the write requests $204_1$, $204_2$ . . . $204n$ in the chain 200, then complete is returned (at block 618) for the write request chain 200 to the host 100. If (from the no branch of block 616) all write requests have not completed and if (at block 620) an error occurred in processing one of the write requests $204_1$, $204_2$ . . . $204n$, then the I/O manager 110a generates (at block 622) a reply 400 to the write request chain 200 indicating an error, which may include the last completed write request 404. The reply 400 is returned (at block 624) to the originating host 100.

In mirror/synchronization environments, the I/O manager 110a at block 616 may determine whether all the write requests $204_1$, $204_2$ . . . $204n$ in the chain 200 have completed at both the primary 102a and secondary 102b storage servers before returning complete. Further, in mirror/synchronization operations, the I/O manager 110a may determine an error at block 620 if there is an error in processing the write requests at either the primary 102a or secondary 102b storage servers.

The described embodiments provide techniques to process a chain of write requests, such as write request groups each having multiple write transactions, to different storage locations by including a commit wait flag indicating whether the write chain is to be processed as a single logical write, such that a next write request may be processed before the previous one is completed. This allows the command to indicate whether processing should be optimized to increase the speed at which writes are processed by not requiring a commit of a write request before the next write request is processed.

The reference characters used herein, such as i, k, m, and n, are used herein to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
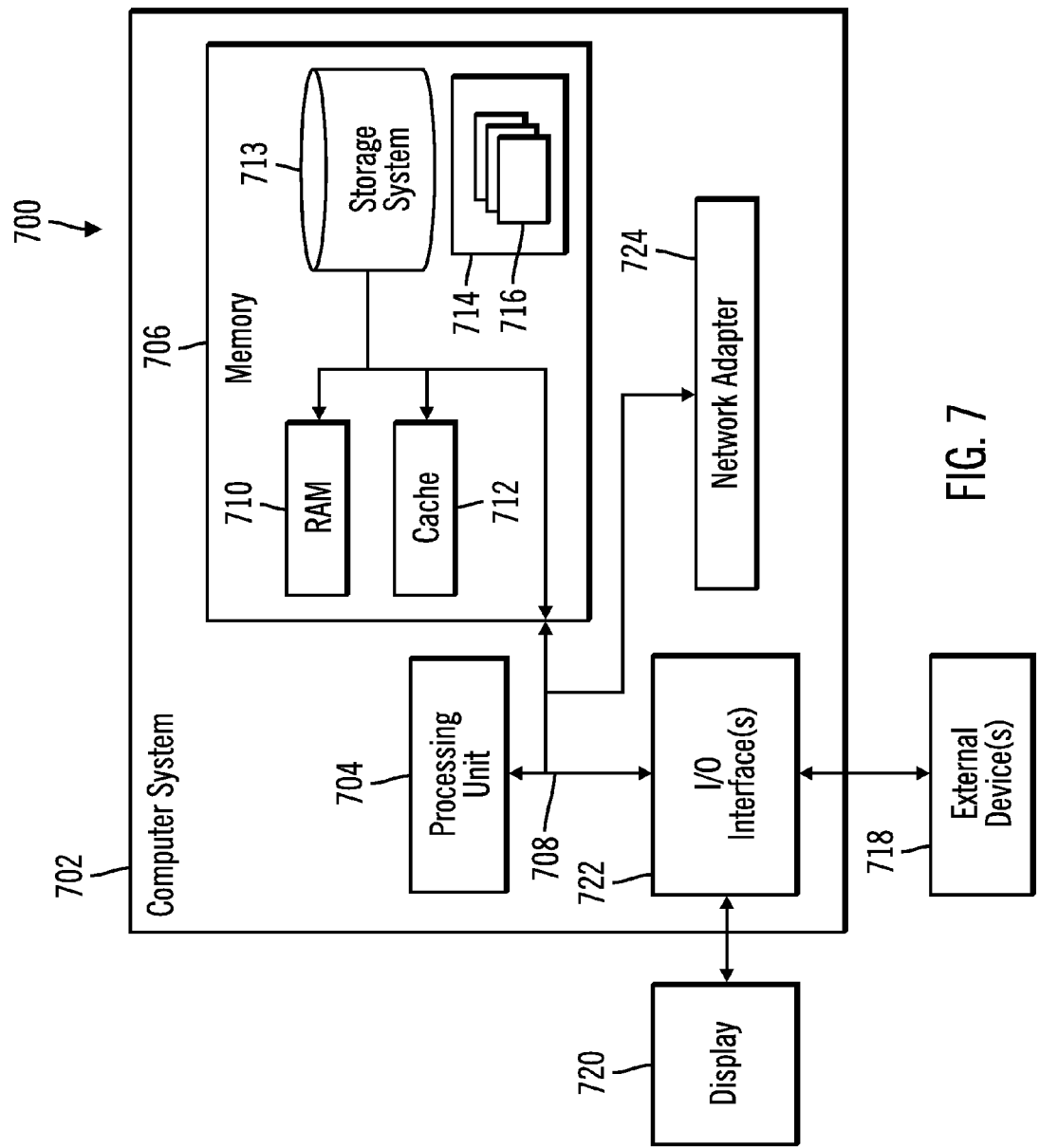
FIG. 7 illustrates a computing environment in which the components of FIG. 1 may be implemented.

The computational components of FIG. 1, including the host 100 and storage servers 102a, 102b may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device.

The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for generating a write chain of write requests to send to a storage server managing access to a storage, wherein the computer program product comprises a computer readable storage medium having program instructions embodied therewith, the program instructions executable by a processor to cause operations, the operations comprising generating a write request chain including a commit wait flag and plurality of write requests directed to storage locations in the storage, wherein the write requests are included in the write request chain in an order;

setting the commit wait flag to one of a first value or a second value, wherein setting the commit wait flag to the first value causes the storage server to process the write requests by requiring a current write request comprising one of the write requests being processed to complete writing data to a storage location in the storage before transferring data for a next write request following the current write request in the order, and wherein setting the commit wait flag to the second value causes the storage server to process the next write request in the write request chain in the order following the current write request in response to initiating a transfer of data for the current write request when the current write request is not a last write request in the write request chain by transferring data for the next write request before completing transfer of the data for the current write request preceding the next write request; and sending the write request chain to the storage server to apply the write requests to the storage.

2. The computer program product of claim 1, wherein each write request comprises a write request group having a plurality of write transactions to the storage, wherein when the commit wait flag has the first value, a next write request group is processed after completing all the write transactions in a current write request group, and wherein when the commit wait flag has the second value, the next write request group is processed after initiating processing of the write transactions in the current write request group before completing the write transactions in the current write request group.

3. The computer program product of claim 2, wherein each write request group comprises a locate record domain defining a range of tracks in the storage to which the write transactions in the locate record domain are written.

4. The computer program product of claim 3, wherein the generating the write request chain comprise generating a command having a prefix including the commit wait flag followed by locate record domains and write transactions.

5. The computer program product of claim 1, wherein the operations further comprise:

receiving a final complete status for the write request chain in response to the storage server committing the write data for a last write request in the write request chain when the commit wait flag has the second value.

6. The computer program product of claim 1, wherein the operations further comprise:

receiving a reply from the storage server to the write request chain indicating that processing of the write request chain ended in error;

generating a recovery write request chain including the write requests in the write request chain following a last completed write request in the write request chain according to an order in which the write requests were included in the write request chain;

setting a commit wait flag in the recovery write request to the second value; and sending the recovery write request chain to the storage server.

7. The computer program product of claim 1, wherein the storage server comprises a primary storage server and the storage comprises a primary storage coupled to the primary storage server, wherein the primary storage server is in communication with a secondary storage server coupled to a secondary storage, wherein the operations further comprise:

receiving a final complete status for the write request chain in response to the primary and the secondary storage servers completing the write requests at the primary and the secondary storages, respectively when the commit wait flag has the second value.

8. The computer program product of claim 7, wherein the operations further comprise:

receiving a reply to the write request chain from the primary storage server indicating that the write request chain ended in error;

generating a recovery write request chain including the write requests in the write request chain following an earlier of a last completed write request at the primary storage server and the secondary storage server, according to an order in which the write requests were included in the write request chain;

setting a commit wait flag in the recovery write request to the second value; and sending the recovery write request chain to the primary storage server to process.

9. A system in communication with a storage server managing access to a storage, comprising:

a processor; and a computer readable storage medium having program instructions embodied therewith, the program instructions executable by the processor to cause operations, the operations comprising:

generating a write request chain including a commit wait flag and plurality of write requests directed to storage locations in the storage, wherein the write requests are included in the write request chain in an order;

setting the commit wait flag to one of a first value or a second value, wherein setting the commit wait flag to the first value causes the storage server to process the write requests by requiring a current write request comprising one of the write requests being processed to complete writing data to a storage location in the storage before transferring data for a next write request following the current write request, and wherein setting the commit wait flag to the second value causes the storage server to process the next write request in the write request chain in the order following the current write request in response to initiating a transfer of data for the current write request when the current write request is not a last write request in the write request chain by transferring data for the next write request before completing transfer of the data for the current write request preceding the next write request; and sending the write request chain to the storage server to apply the write requests to the storage.

10. The system of claim 9, wherein each write request comprises a write request group having a plurality of write transactions to the storage, wherein when the commit wait flag has the first value, a next write request group is processed after completing all the write transactions in a current write request group, and wherein when the commit wait flag has the second value, the next write request group is processed after initiating processing of the write transactions in the current write request group before completing the write transactions in the current write request group.

11. The system of claim 10, wherein each write request group comprises a locate record domain defining a range of tracks in the storage to which the write transactions in the locate record domain are written.

12. The system of claim 9, wherein the operations further comprise:
   receiving a final complete status for the write request chain in response to the storage server committing the write data for a last write request in the write request chain when the commit wait flag has the second value.

13. The system of claim 9, wherein the operations further comprise:
   receiving a reply from the storage server to the write request chain indicating that processing of the write request chain ended in error;
   generating a recovery write request chain including the write requests in the write request chain following a last completed write request in the write request chain according to an order in which the write requests were included in the write request chain;
   setting a commit wait flag in the recovery write request to the second value; and
   sending the recovery write request chain to the storage server.

14. The system of claim 9, wherein the storage server comprises a primary storage server and the storage comprises a primary storage coupled to the primary storage server, wherein the primary storage server is in communication with a secondary storage server coupled to a secondary storage, wherein the operations further comprise:
   receiving a final complete status for the write request chain in response to the primary and the secondary storage servers completing the write requests at the primary and the secondary storages, respectively when the commit wait flag has the second value.

15. A method for generating a write chain of write requests to send to a storage server managing access to a storage, comprising
   generating a write request chain including a commit wait flag and plurality of write requests directed to storage locations in the storage, wherein the write requests are included in the write request chain in an order;
   setting the commit wait flag to one of a first value or a second value, wherein setting the commit wait flag to the first value causes the storage server to process the write requests by requiring a current write request comprising one of the write requests being processed to complete writing data to a storage location in the storage before transferring data for a next write request following the current write request, and wherein setting the commit wait flag to the second value causes the storage server to process the next write request in the write request chain in the order following the current write request in response to initiating a transfer of data for the current write request when the current write request is not a last write request in the write request chain by transferring data for the next write request before completing transfer of the data for the current write request preceding the next write request; and
   sending the write request chain to the storage server to apply the write requests to the storage.

16. The method of claim 15, wherein each write request comprises a write request group having a plurality of write transactions to the storage,
   wherein when the commit wait flag has the first value, a next write request group is processed after completing all the write transactions in a current write request group, and
   wherein when the commit wait flag has the second value, the next write request group is processed after initiating the processing of the write transactions in the current write request group before completing the write transactions in the current write request group.

17. The method of claim 16, wherein each write request group comprises a locate record domain defining a range of tracks in the storage to which the write transactions in the locate record domain are written.

18. The method of claim 15, further comprising:
   receiving a final complete status for the write request chain in response to the storage server committing the write data for a last write request in the write request chain when the commit wait flag has the second value.

19. The method of claim 15, further comprising:
   receiving a reply from the storage server to the write request chain indicating that the processing of the write request chain ended in error;
   generating a recovery write request chain including the write requests in the write request chain following a last completed write request in the write request chain according to an order in which the write requests were included in the write request chain;
   setting a commit wait flag in the recovery write request to the second value; and
   sending the recovery write request chain to the storage server.

20. The method of claim 15, wherein the storage server comprises a primary storage server and the storage comprises a primary storage coupled to the primary storage server, wherein the primary storage server is in communication with a secondary storage server coupled to a secondary storage, further comprising:
   receiving a final complete status for the write request chain in response to the primary and the secondary storage servers completing the write requests at the primary and the secondary storages, respectively when the commit wait flag has the second value.

* * * * *